(12) United States Patent
Deragon et al.

(10) Patent No.: US 12,348,817 B2
(45) Date of Patent: Jul. 1, 2025

(54) METHODS AND APPARATUS TO DETERMINE ADDITIVE REACH ADJUSTMENT FACTORS FOR AUDIENCE MEASUREMENT

(71) Applicant: The Nielsen Company (US), LLC, New York, NY (US)

(72) Inventors: Joshua T. Deragon, Pittsburgh, PA (US); David J. Kurzynski, Elgin, IL (US); Denis Voytenko, Oldsmar, FL (US); Horalia Armas, Palatine, IL (US); William DeShong, Virginia Beach, VA (US); Brett Gebhardt, Los Angeles, CA (US)

(73) Assignee: The Nielsen Company (US), LLC, New York, NY (US)

(*) Notice: Subject to any disclaimer, the term of this patent is extended or adjusted under 35 U.S.C. 154(b) by 78 days.

(21) Appl. No.: 17/978,054

(22) Filed: Oct. 31, 2022

(65) Prior Publication Data
US 2023/0396844 A1    Dec. 7, 2023

Related U.S. Application Data

(60) Provisional application No. 63/349,471, filed on Jun. 6, 2022.

(51) Int. Cl.
*H04N 21/458* (2011.01)
*H04N 21/466* (2011.01)

(52) U.S. Cl.
CPC ..... *H04N 21/4586* (2013.01); *H04N 21/4667* (2013.01)

(58) Field of Classification Search
CPC .................. H04N 21/4586; H04N 21/4667
See application file for complete search history.

(56) References Cited

U.S. PATENT DOCUMENTS

| 8,739,197 | B1* | 5/2014 | Pecjak | H04N 21/2407 |
|---|---|---|---|---|
| | | | | 725/9 |
| 2014/0282723 | A1* | 9/2014 | Sinha | H04H 60/37 |
| | | | | 725/35 |

(Continued)

OTHER PUBLICATIONS

United States Patent Office, "Non-Final Office Action," issued in connection with U.S. Appl. No. 17/896,858, dated Feb. 16, 2024, 12 pages.

*Primary Examiner* — Jefferey F Harold
*Assistant Examiner* — Franklin S Andramuno

(57) ABSTRACT

Methods, apparatus, systems, and articles of manufacture to determine an additive reach adjustment factor for audience measurement are disclosed. An example apparatus for additive reach adjustment includes at least one memory, machine readable instructions, and processor circuitry to execute the machine readable instructions to identify a first probability, the first probability associated with a population tuning to a marketing campaign, the tuning including missing data, identify a second probability, the second probability associated with the population not tuning to the marketing campaign or the tuning including missing data, determine an additive reach adjustment based on a compound probability and a no-tuning probability, the compound probability and the no-tuning probability determined using the first probability and the second probability, and credit a population exposed to the marketing campaign to include missing impressions based on the additive reach adjustment.

19 Claims, 12 Drawing Sheets

(56) References Cited

U.S. PATENT DOCUMENTS

2014/0380350 A1* 12/2014 Shankar .......... H04N 21/25883
                                                      725/18
2017/0302997 A1    10/2017 Brown
2022/0303618 A1     9/2022 Whitely et al.

* cited by examiner

UNMEASURED STATIONS IMPACT SCENARIO 1

502 ↘  504  506  508

| DAY(PART) | STATION A | STATION B |
|---|---|---|
| 1 | 1 | 0 |
| 2 | 1 | 1 |
| 3 | 0 | 0 |
| 4 | 1 | 0 |
| 5 | 0 | 1 |
| TRUE TUNING DATA; NO UNMEASURED STATIONS/TUNING | | |

509 ↘  504  506  508

| DAY(PART) | STATION A | STATION B |
|---|---|---|
| 1 | 1 | 0 |
| 2 | 0 | 1 |
| 3 | 0 | 0 |
| 4 | 0 | 0 |
| 5 | 0 | 1 |
| BIG DATA; UNMEASURED TUNING | | |

UNMEASURED STATIONS IMPACT SCENARIO 2

502 ↘  504  506  508

| DAY(PART) | STATION A | STATION B |
|---|---|---|
| 1 | 1 | 0 |
| 2 | 1 | 1 |
| 3 | 0 | 0 |
| 4 | 1 | 0 |
| 5 | 0 | 1 |
| TRUE TUNING DATA; NO UNMEASURED STATIONS/TUNING | | |

510 ↘  504  506  508

| DAY(PART) | STATION A | STATION B |
|---|---|---|
| 1 | 0 | 0 |
| 2 | 0 | 0 |
| 3 | 0 | 0 |
| 4 | 0 | 0 |
| 5 | 0 | 0 |
| BIG DATA; UNMEASURED TUNING | | |

FIG. 5A

512 ↘ PROBABILITY STATION WAS VIEWED

| UNIVERSE ESTIMATE = | 100 | | | |
|---|---|---|---|---|
| DAY-DAYPART | PERSON | PERSON WEIGHT | STATION A | STATION B |
| 1-1 | 1 | 15 | 0 | 1.5 |
| 1-1 | 2 | 20 | 1.2 | 0 |
| 1-1 | 3 | 10 | 1.2 | 0 |
| 1-1 | 4 | 15 | 1.2 | 1.5 |
| IMPRESSIONS (SUM) 514 | | | 54 | 45 |
| CHANCE OF VIEWING (IMPRESSIONS/ UNIVERSE ESTIMATE) 516 | | | 54% | 45% |

520 ↘ PERCENTAGE OF STATION TUNING THAT IS UNMEASURED

521  522

| | STATION A | STATION B |
|---|---|---|
| FACTOR | 1.2 | 1.5 |
| FORUMULA | 1-(1/1.2) | 1-(1/1.5) |
| UNMEASURED TUNING PERCENT | 16.67% | 33.33% |

PROBABILITIES OF POPULATION TUNING AND PROBABILITIES OF UNMEASURED TUNING

526

| PERCENT OF POPULATION TUNING | | |
|---|---|---|
| DAY(PART) | STATION A | STATION B |
| 1-1 | 5% | 10% |
| 1-2 | 4% | 12% |
| 1-3 | 7% | 12% |
| 1-4 | 1% | 9% |
| 1-5 | 5% | 10% |

528

| PERCENT OF TUNING MISSING/UNMEASURED | | |
|---|---|---|
| DAY(PART) | STATION A | STATION B |
| 1-1 | 10% | 33% |
| 1-2 | 5% | 1% |
| 1-3 | 9% | 15% |
| 1-4 | 0% | 6% |
| 1-5 | 11% | 5% |

530

PROBABILITY OF EXPOSURE AND TUNING UNMEASURED

532

| PERCENT WATCHED AND MISSING/UNMEASURED | | |
|---|---|---|
| DAY(PART) | STATION A | STATION B |
| 1 | 0.50% | 3.30% |
| 2 | 0.20% | 0.12% |
| 3 | 0.63% | 1.80% |
| 4 | 0.00% | 0.54% |
| 5 | 0.55% | 0.50% |

PROBABILITIES OF POPULATION TUNING AND NOT TUNING

526

| PERCENT OF POPULATION TUNING | | |
|---|---|---|
| DAY(PART) | STATION A | STATION B |
| 1-1 | 5% | 10% |
| 1-2 | 4% | 12% |
| 1-3 | 7% | 12% |
| 1-4 | 1% | 9% |
| 1-5 | 5% | 10% |

548

| PERCENT OF POPULATION NOT TUNING | | |
|---|---|---|
| DAY(PART) | STATION A | STATION B |
| 1-1 | 95% | 90% |
| 1-2 | 96% | 88% |
| 1-3 | 93% | 88% |
| 1-4 | 99% | 91% |
| 1-5 | 95% | 90% |

550

PROBABILITY OF NOT TUNING *OR* TUNING BUT MISSING DATA

555

| PERCENT NOT TUNING *OR* TUNED AND MISSING | | |
|---|---|---|
| DAY(PART) | STATION A | STATION B |
| 1-1 | 95.50% | 93.30% |
| 1-2 | 96.20% | 88.12% |
| 1-3 | 93.63% | 89.80% |
| 1-4 | 99.00% | 91.54% |
| 1-5 | 95.55% | 90.50% |

FIG. 5D

560 — COMPOUND PROBABILITY FOR NOT TUNING OR TUNING AND MISSING DATA
562

| PERCENT NOT TUNING OR TUNED MISSING | | | PRODUCT OF A AND B |
|---|---|---|---|
| DAY-DAYPART | STATION A | STATION B | |
| 1-1 | 95.50% | 93.30% | 89.10% |
| 1-2 | 96.20% | 88.12% | 84.77% |
| 1-3 | 93.63% | 89.80% | 84.08% |
| 1-4 | 99.00% | 91.54% | 90.62% |
| 1-5 | 95.55% | 90.50% | 86.47% |
| PROBABILITY OF NOT TUNING OR TUNING AND MISSING FOR ALL DAY(PART)S AND ALL STATIONS | | | 49.77% |

563
OR
565

| PERCENT NOT TUNING OR TUNED AND MISSING | | |
|---|---|---|
| DAY-DAYPART | STATION A | STATION B |
| 1-1 | 95.50% | 93.30% |
| 1-2 | 96.20% | 88.12% |
| 1-3 | 93.63% | 89.80% |
| 1-4 | 99.00% | 91.54% |
| 1-5 | 95.55% | 90.50% |
| PROBABILITY OF NOT TUNING OR TUNING AND MISSING FOR ALL DAY(PART)S AND ALL STATIONS | | 49.77% |

X
565

570 — PROBABILITY OF NOT TUNING FOR ALL DAY(PART)S AND ALL STATIONS

| PERCENT OF POPULATION NOT TUNING | | | PRODUCT OF A AND B |
|---|---|---|---|
| DAY-DAYPART | STATION A | STATION B | |
| 1-1 | 95% | 90% | 85.50% |
| 1-2 | 96% | 88% | 84.48% |
| 1-3 | 93% | 88% | 81.84% |
| 1-4 | 99% | 91% | 90.09% |
| 1-5 | 95% | 90% | 85.50% |
| PROBABILITY OF NOT TUNING FOR ALL DAY(PARTS)S AND ALL STATIONS | | | 45.53% |

575
OR
572

| PERCENT OF POPULATION NOT TUNING | | |
|---|---|---|
| DAY-DAYPART | STATION A | STATION B |
| 1-1 | 95% | 90% |
| 1-2 | 96% | 88% |
| 1-3 | 93% | 88% |
| 1-4 | 99% | 91% |
| 1-5 | 95% | 90% |
| PROBABILITY OF NOT TUNING FOR ALL DAYS AND ALL STATIONS | | 45.53% |

580 —
PROBABILITY OF WATCHING FOR ANY DAY(PART) AND ANY STATION BUT ALL GO UNMEASURED/MISSING

| PERCENT OF POPULATION NOT TUNING | | |
|---|---|---|
| DAY-DAYPART | STATION A | STATION B |
| 1-1 | 95.50% | 93.30% |
| 1-2 | 96.20% | 88.12% |
| 1-3 | 93.63% | 89.80% |
| 1-4 | 99.00% | 91.54% |
| 1-5 | 95.55% | 90.50% |
| PROBABILITY OF NOT TUNING OR TUNING AND MISSING FOR DAY(PART)S AND ALL STATIONS | | 49.77% |

565

| PERCENT OF POPULATION NOT TUNING | | |
|---|---|---|
| DAY-DAYPART | STATION A | STATION B |
| 1-1 | 95% | 90% |
| 1-2 | 96% | 88% |
| 1-3 | 93% | 88% |
| 1-4 | 99% | 91% |
| 1-5 | 95% | 90% |
| PROBABILITY OF NOT TUNING FOR ALL DAYS AND ALL STATIONS | | 45.53% |

572

Additive Unmeasured Reach Adjustment = 49.77% - 45.53% = 4.23%

FIG. 5F

METHODS AND APPARATUS TO DETERMINE ADDITIVE REACH ADJUSTMENT FACTORS FOR AUDIENCE MEASUREMENT

RELATED APPLICATIONS

This patent claims the benefit of U.S. Patent Application No. 63/349,471, filed on Jun. 6, 2022. U.S. Patent Application No. 63/349,471 is hereby incorporated herein by reference in its entirety. Priority to U.S. Patent Application No. 63/349,471 is claimed.

FIELD OF THE DISCLOSURE

This disclosure relates generally to reach and, more particularly, to determining additive reach adjustment factors for audience measurement.

BACKGROUND

Audiences of digital media have extensive options of content (e.g., shows, films, news, online videos, etc.) to access using numerous sources (e.g., cable, over the air (OTA), smart televisions (TVs), digital streaming devices, or alternate delivery systems (ADS), such as satellite). Tuning data (e.g., minutes viewed, content title, genre, daypart, demographic, device type, etc.) is collected to gather insights on audiences viewing the content and can include panel data and/or Big Data.

BRIEF DESCRIPTION OF THE DRAWINGS

FIG. 5A illustrates example data including a comparison between true tuning data and big data including unmeasured tuning.

FIG. 5B illustrates example data including a probability that a population was exposed to given station(s) during a marketing campaign and a percentage of tuning that remains unmeasured.

FIG. 5C illustrates example data including a percentage of a population tuning and a percentage of tuning that is missing and/or unmeasured.

FIG. 5D illustrates example data including probabilities associated with a given population of viewers tuning and/or not tuning, and associated percentages of a population tuning but including missing data.

FIG. 5E illustrates example compound probabilities for a population not tuning or tuning with unmeasured and/or missing data and no-tuning probabilities.

FIG. 5F illustrates example additive unmeasured reach adjustment based on compound probability and no-tuning probability determined in the example of FIG. 5E.

The figures are not to scale. In general, the same reference numbers will be used throughout the drawing(s) and accompanying written description to refer to the same or like parts.

Figure 1:
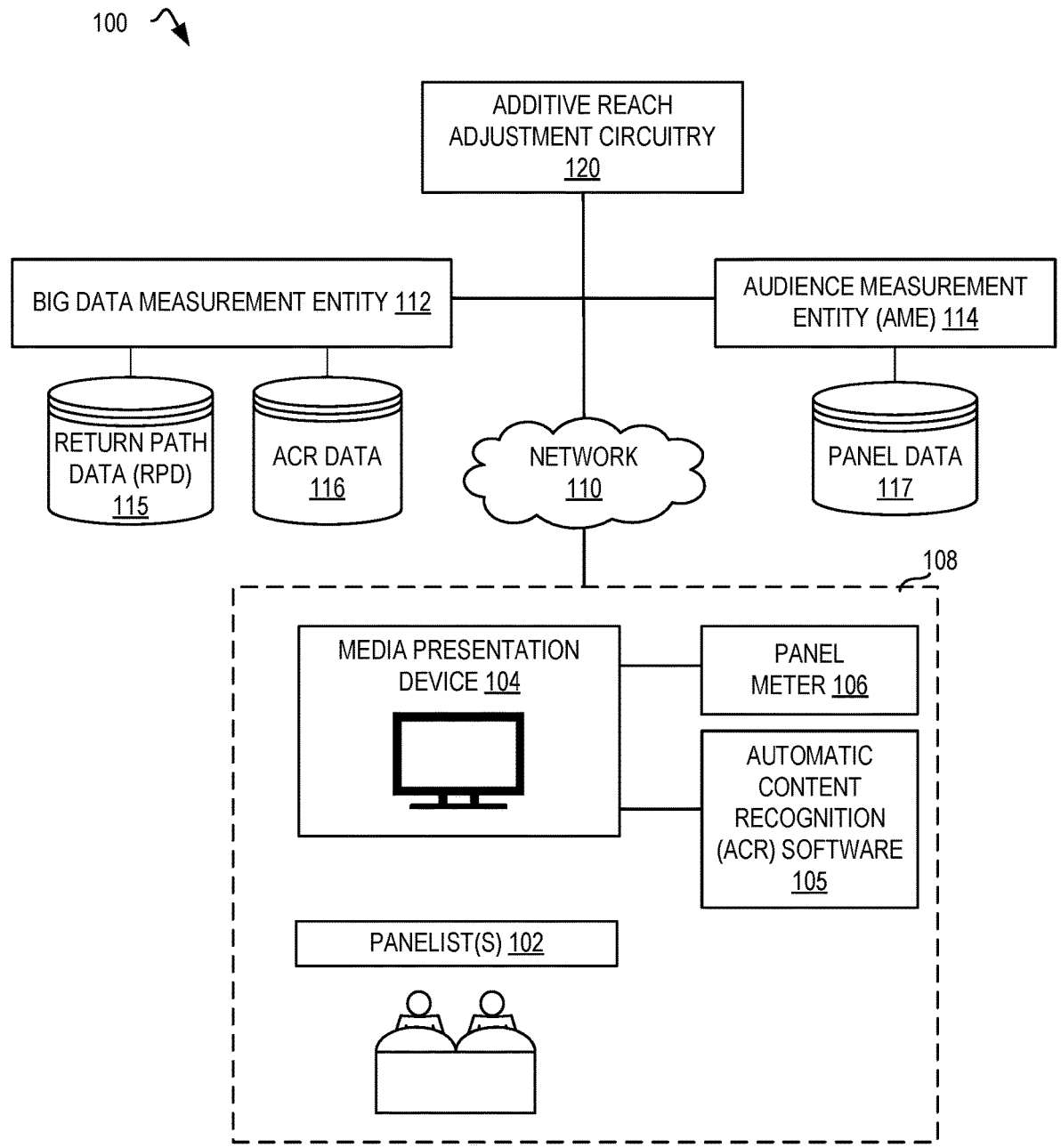
FIG. 1 is an example environment including additive reach adjustment circuitry to perform viewership adjustment, such as additive reach adjustment, in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement entities (AMEs) perform measurements to determine the number of people (e.g., an audience) who engage in viewing television, listening to radio stations, or browsing websites. Given that companies and/or individuals producing content and/or advertisements want to understand the reach and effectiveness of their content, it is useful to identify such information. To achieve this, companies such as The Nielsen Company, LLC (US), LLC utilize on-device meters (ODMs) to monitor usage of cellphones, tablets (e.g., iPads™) and/or other computing devices (e.g., PDAs, laptop computers, etc.) of individuals who volunteer to be part of a panel (e.g., panelists). Panelists are users who have provided demographic information at the time of registration into a panel, allowing their demographic information to be linked to the media they choose to listen to or view. As a result, the panelists (e.g., the audience) represent a statistically significant sample of the large population (e.g., the census) of media consumers, allowing broadcasting companies and advertisers to better understand who is utilizing their media content and maximize revenue potential. When a media user is also a part of the AME's panel (e.g., a panelist), the AME is able to match panelist demographics (e.g., age, occupation, etc.) to the panelist's media usage data.

In some examples, tuning data (e.g., minutes viewed, content title, genre, daypart, demographic, device type, etc.) can be collected to gather insights on audiences viewing the content. For example, tuning data can include panel data and/or Big Data. Panel data is monitored and measured (e.g., via surveys, metering devices, sensors, background applications, etc.) for a panel of households and/or members to better understand characteristics of audiences that view particular stations or over the top (OTT) streaming services. The panel includes panelists who represent a subset of members with varying demographics to represent the larger population. The panel data can inform which panel members of the panel household are using a presentation device at a given time. Alternatively, Big Data is collected in the form of return path data (RPD) and automated content recognition (ACR) data to complement the panel data. Big Data monitors a much larger audience than the panel and includes information related to specific content viewed, content metadata, and engagement (e.g., number of viewing minutes) of the panel member(s). While RPD can be gathered via a set-top box (e.g., a cable or satellite box), ACR-based data can be gathered via ACR devices/technology integrated with or connected to, for example, Smart TVs (e.g., Vizio®) and/or hardware digital media devices (e.g., Roku®).

However, in some examples, tuning from the Big Data in a national sample can be missing due to content that is unrecognized when using ACR-based software. For example, third party media measurement companies may receive tuning from ACR devices, and ACR devices identify what the tuning information is. Some stations are unidentified by the ACR devices due to the ACR devices not recognizing the station. As such, the tuning of the stations goes unmeasured. In some examples, missing tuning can create instances where reach is lower due to a number of people that are missing tuning data. In some examples, instances where unmeasured stations impact the reach are instances where all of an individual's tuning to a marketing campaign is missing. In some examples, there are instances where only some, but not all, of an individual's tuning to a campaign is missing. In such an example, the individual is still included in the reach calculation.

In some examples, each station for each daypart can be given a station factor (e.g., a value between 1 and 1.5) to account for the missing tuning. For example, additional weight can be given to stations, using the station factors, during certain time periods to account for the missing tuning data. In some examples, the station factors are determined based on panel data. Given that there is usually some missing tuning, the actual reach can be larger than what the reach is calculated to be, such that the station factors can be used in combination with tuning information of the sample to adjust the calculated reach to account for this missing tuning data. For example, additional weight is given to stations during certain time periods to account for missing viewing using multiplicative station tuning factors. However, these station factors are estimates and may not completely represent the amount of unmeasured tuning for a given station and daypart.

Examples disclosed herein determine a viewership adjustment, such as an additive reach adjustment, that can be added to a calculated reach from a given data set (e.g., from an ACR device). For example, examples disclosed herein determine whether an individual viewed and/or was exposed to a media marketing campaign during a given period of time. The additive reach adjustment for unmeasured tuning can be used to calculate the percent probability that an individual in the sample had viewed tuning, but that tuning went missing due to the unrecognized ACR. For example, the missing tuning can be added to the final reach calculation as an additive reach adjustment. Examples disclosed herein determine reach normally without factoring in unmeasured station factors. In examples disclosed herein, the percentage of a population that tuned to a desired marketing campaign (e.g., station) for each day, daypart, and/or station can be determined using a first calculation (e.g., multiplying an entity weight value by a tuning factor and summing across all entities in the sample for each station, day and/or daypart, then dividing by the universe estimate). In examples disclosed herein, calculating the percentage of tuning that went missing for each station, day, and/or daypart can be performed using the unmeasured tuning factor. In examples disclosed herein, a probability that an entity (e.g., group of individuals expected to be affected by the marketing campaign) was present during a media presentation session and the tuning went missing can be determined for all stations, days and/or dayparts to obtain a probability that an individual had (1) watched a given media presentation session and the tuning was missing or (2) had not watched a given media presentation across all days, dayparts, and/or stations. In examples disclosed herein, a final additive reach adjustment for unmeasured tuning can be obtained representing the probability of an entity watching a given media session but missing the tuning in all instances across the stations, days, and/or dayparts. For example, the additive reach adjustment factor determined herein accounts for only those individuals that are exposed to a marketing campaign during a given period of time, but the tuning associated with this exposure is missing. Methods and apparatus disclosed herein permit improved accuracy of the reach estimation across stations, days, and/or dayparts.

FIG. 1 is an example environment 100 including example additive reach adjustment circuitry 120 to perform additive reach adjustment in accordance with teachings of this disclosure. The environment 100 includes example panelist(s) 102, an example media presentation device 104, example automatic content recognition (ACR) software 105, an example panel meter 106, an example network 110, an example big data measurement entity 112, an example audience measurement entity (AME) 114, example return path data (RPD) 115, example ACR data 116, example panel data 117, and/or example additive reach adjustment circuitry 120.

The panelist(s) 102 can include individuals who volunteer to be part of a panel. Panelists 102 are users who have provided demographic information at the time of registration into a panel, allowing their demographic information to be linked to the media they choose to listen to or view. In some examples, the panelist(s) 102 provide information about media access activities. For example, panelists can install the panel meter 106 to actively participate in the panel (e.g., send activity logs).

The media presentation device 104 can include any type of media presentation device and/or electronic user device (e.g., a personal computer). In operation, the media presentation device 104 presents content such as television shows, movies, commercials, etc. In the example of FIG. 1, the media presentation device 104 can be in communication with the ACR software 105 and/or the panel meter 106 to determine panelist exposure to specific media content. In the example of FIG. 1, the media presentation device 104 is located in an example media presentation environment 108 that includes panelist(s) 102 and the panel meter 106. For example, the media presentation environment 108 can correspond to a panelist home and/or specific room of the panelist home that houses the media presentation device 104 and the corresponding installed ACR software 105 and/or panel meter 106.

The ACR software 105 recognized content presented on the media presentation device 104 by sampling small portions of video and/or audio and comparing the samples to a larger database. For example, ACR software 105 can create a fingerprint (e.g., acoustic fingerprint and/or video fingerprint) from a given sample and compare against an extensive database of fingerprints to automatically recognize what was being watched and/or listened to by the panelist(s) 102. In some examples, a database of fingerprints can be generated using either audio or video fingerprinting and the content that is being played on the media presentation device 104 (e.g., ACR-enabled device) generates fingerprints that can be compared with the database to recognize the content. In some examples, ACR software 105 permits content attribution and/or normalization across a variety of sources (e.g., recognize the content being played not depending on whether the content streaming to the media presentation device 104 originates from a set-top box, a Roku®, etc.).

The panel meter 106 can be implemented by software that collects data of interest concerning usage of the monitored device (e.g., media presentation device 104). The panel meter 106 can collect data indicating media access activities (e.g., website names, dates/times of access, page views, duration of access, clickstream data and/or other media identifying information (e.g., webpage content, advertisements, etc.)) to which the panelist(s) 102 are exposed. This data is uploaded, periodically or aperiodically, to a data collection facility (e.g., the audience measurement entity server). In some examples, the panel meter 106 can include a local people meter (LPM), a portable people meter (PPMs), and/or a stationary metering device (e.g., such as Global Television Audience Metering (GTAM) meters, A/P meters, Nano meters, etc.) provided to AME panelist(s) 102. In some examples, the panel meter 106 can include a memory, a microphone, a wireless transceiver, and/or a power supply (e.g., rechargeable batteries).

The network 110 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The big data measurement entity 112 identifies and/or stores measurements associated with big data (e.g., return path data (RPD) 115, ACR data 116, etc.). While big data measurement entity 112 data provides information about media presentation device 104 viewership, information about individual usage is not included (e.g., contrary to the panel data 117 collected by the AME 114). For example, the big data measurement entity 112 collects big data in the form of RPD 115 and ACR data 116 to complement the panel data 117. The big data measurement entity 112 monitors a much larger audience than the panel and includes information related to specific content viewed, content metadata, and engagement (e.g., number of viewing minutes) of the panelist(s) 102. While RPD 115 can be gathered via a set-top box (STB) (e.g., a cable or satellite box), ACR data 116 can be gathered via ACR devices/technology (e.g., ACR software 105) integrated with or connected to, for example, Smart TVs and/or hardware digital media devices.

The AME 114 operates as an independent party to measure and/or verify audience measurement information relating to media accessed by subscribers of a database proprietor. When media is accessed using the media presentation device 104, the AME 114 stores information relating to user viewership and/or media exposure (e.g., length of time that a panelist viewed a television program, etc.). In some examples, the AME 114 receives demographic information from the enrolling people (e.g., panelist(s) 102) so that subsequent correlations may be made between advertisement/media exposure to those panelists and different demographic markets, allowing the panelist(s) 102 to represent a statistically significant sample of the large population of media consumers. In the example of FIG. 1, the AME 114 stores data associated with the panelist(s) 102 as panel data 117.

The additive reach adjustment circuitry 120 performs an additive reach adjustment calculation to account for missing impressions resulting from individuals who are exposed to media via the media presentation device 104 (e.g., as part of a marketing campaign) but their exposure to the media (e.g., marketing campaign) is not credited properly. In examples disclosed herein, the additive reach adjustment circuitry 120 identifies a percentage of a given population that tuned to a desired marketing campaign for each day, daypart, and/or station. In examples disclosed herein, the additive reach adjustment circuitry 120 also identifies a percentage of tuning that is unmeasured for each station, day, and daypart based on a tuning factor. Furthermore, the additive reach adjustment circuitry 120 also determines compound and/or no-tuning probabilities for a marketing campaign across all days, dayparts, and/or stations. In examples disclosed herein, the additive reach adjustment circuitry 120 determines an additive reach adjustment based on the compound and/or non-tuning probabilities, as described in more detail in connection with FIG. 4.

Figure 2:
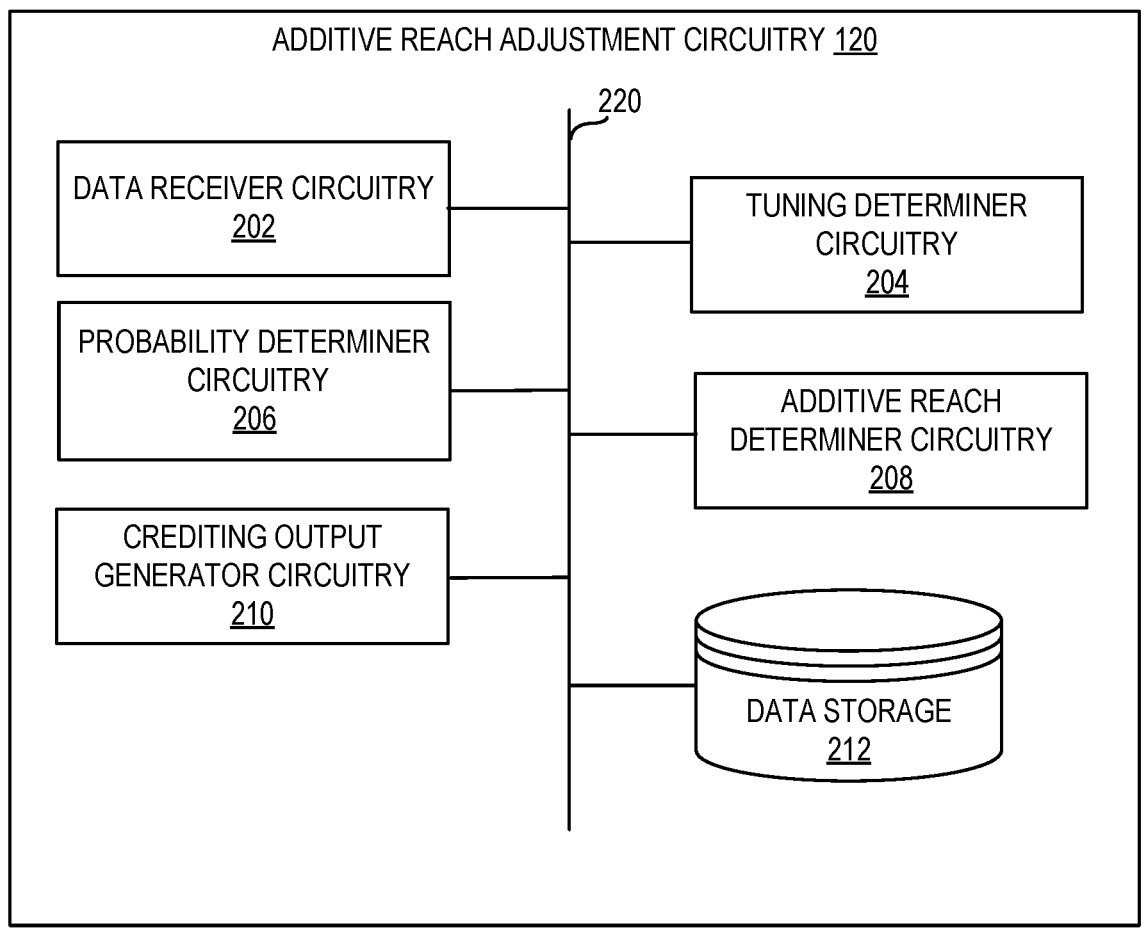
FIG. 2 is a block diagram of an example implementation of the additive reach adjustment circuitry of FIG. 1.

FIG. 2 is a block diagram 200 of an example implementation of the additive reach adjustment circuitry 120 of FIG. 2. The additive reach adjustment circuitry 120 of FIG. 1 may be instantiated (e.g., creating an instance of, bring into being for any length of time, materialize, implement, etc.) by processor circuitry such as a central processing unit executing instructions. Additionally or alternatively, the additive reach adjustment circuitry 120 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the example of FIG. 2, the additive reach adjustment circuitry 120 includes example data receiver circuitry 202, example tuning determiner circuitry 204, example probability determiner circuitry 206, example additive reach determiner circuitry 208, example crediting output generator circuitry 210, and example data storage 212. In the example of FIG. 2, the data receiver circuitry 202, the tuning determiner circuitry 204, the probability determiner circuitry 206, the additive reach determiner circuitry 208, the crediting output generator circuitry 210, and/or the data storage 212 are in communication using an example bus 220.

The data receiver circuitry 202 receives data from the big data measurement entity 112 and/or the audience measurement entity (AMIE) 114, including tuning information. For example, the data receiver circuitry 202 receives return path data (RPD) 115, ACR data 116, and/or panel data 117. In some examples, the data receiver circuitry 202 receives data relating to user viewership and/or media exposure (e.g., length of time that a panelist viewed a television program, etc.). In some examples, the data receiver circuitry 202 receives data from the AME 114 and/or the big data measurement entity 112 directly from the panel meter 106 and/or the ACR software 105 of FIG. 1 (e.g., via the network 110) that provides information about media presentation device 104 viewership (e.g., exposure to a marketing campaign). In some examples, the data receiver circuitry 202 obtains tuning information. For example, tuning information includes an entity corresponding to the tuning information, such as a person or a household, a period of time corresponding to when the tuning information was collected, and station information corresponding to a specific channel, show, television program, etc., that the entity may have been exposed to. In some examples, the tuning information also includes measurement data corresponding to whether the entity was exposed to and/or viewed a station during a particular period of time. In some examples, the data receiver circuitry 202 obtains a weight for an entity. For example, data receiver circuitry 202 obtains a weight value indicative of how many people are in a population that the entity represents. In some examples, the data receiver circuitry 202 obtains a tuning factor, such as the factor described above, for the station that is being measured. As used herein, a "station factor" and a "tuning factor" are used interchangeably.

The tuning determiner circuitry 204 determines a percentage of a target population that is tuned to a desired marketing campaign and/or a percentage of tuning that was unmeasured for a desired marketing campaign. In some examples, the desired marketing campaign corresponds to a particular station. In examples disclosed herein, the tuning determiner circuitry 204 identifies the tuning percentage(s) for a particular daypart and/or station, as described in more detail in connection with FIG. 4.

The probability determiner circuitry 206 determines a first probability that a population was exposed to (e.g., tuned to) the marketing campaign for a particular day/daypart but the tuning was unmeasured. In some examples, the first probability that the population was exposed to the marketing campaign is determined by multiplying a percentage of the population who tuned to the desired marketing campaign on that particular day/daypart by the percentage corresponding to tuning that was unmeasured for the desired marketing campaign. The example probability determiner circuitry 206 determines a second probability that the population was not exposed to (e.g., did not tune to) the marketing campaign on a particular day/daypart or the tuning was unmeasured. For example, the probability determiner circuitry 206 determines the second probability by subtracting the percentage of the population who tuned to a desired marketing campaign from one, and then adding that value to the corresponding first probability. The probability determiner circuitry 206 determines a compound probability that an entity was not exposed to (e.g., did not tune to) the marketing campaign or the tuning was unmeasured across all days, dayparts, and stations. In examples disclosed herein, the probability determiner circuitry 206 also determines a separate no-tuning probability corresponding to the probability that the population was not exposed to (e.g., did not tune to) the marketing campaign across all days, day parts, and/or stations.

The additive reach determiner circuitry 208 determines an additive reach adjustment based on the difference between the compound probability and the no-tuning probability, as described in more detail in connection with FIG. 4. For example, the additive reach adjustment is a probability that an entity was exposed to the marketing campaign over a selected time period but was not credited for the impression(s).

The crediting output generator circuitry 210 updates crediting based on the additive reach adjustment calculations. For example, once an unmeasured reach percentage has been determined, the unmeasured reach percentage can be added on as an adjustment to a calculated reach from a given data set, such that a calculation is performed to determine whether or not someone viewed a campaign during a given time period, while not taking into account any station-based adjustment factors. As such, the crediting output generator circuitry 210 calculates reach on tuning data without the use of station-based factors and adds the calculated reach adjustment to a known reach to obtain a final reach that is representative of the actual reach of a marketing campaign.

The data storage 212 can be used to store any information associated with the data receiver circuitry 202, the tuning determiner circuitry 204, the probability determiner circuitry 206, the additive reach determiner circuitry 208, the crediting output generator circuitry 210. The example data storage 212 of the illustrated example of FIG. 2 can be implemented by any memory, storage device and/or storage disc for storing data such as flash memory, magnetic media, optical media, etc. Furthermore, the data stored in the example data storage 212 can be in any data format such as binary data, comma delimited data, tab delimited data, structured query language (SQL) structures, image data, etc.

In some examples, the apparatus includes means for receiving data. For example, the means for receiving data may be implemented by data receiver circuitry 202. In some examples, the data receiver circuitry 202 may be instantiated by processor circuitry such as the example processor circuitry 612 of FIG. 6. For instance, the data receiver circuitry 202 may be instantiated by the example microprocessor 700 of FIG. 7 executing machine executable instructions such as those implemented by at least blocks 302, 305 of FIG. 3. In some examples, the data receiver circuitry 202 may be instantiated by hardware logic circuitry, which may be implemented by an ASIC, XPU, or the FPGA circuitry 800 of FIG. 8 structured to perform operations corresponding to the machine readable instructions. Additionally or alternatively, the data receiver circuitry 202 may be instantiated by any other combination of hardware, software, and/or firmware. For example, the data receiver circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining tuning. For example, the means for determining tuning may be implemented by tuning determiner circuitry 204. In some examples, the tuning determiner circuitry 204 may be instantiated by processor circuitry such as the example processor circuitry 612 of FIG. 6. For instance, the tuning determiner circuitry 204 may be instantiated by the example microprocessor 700 of FIG. 7 executing machine executable instructions such as those implemented by at least blocks 405, 410 of FIG. 4. In some examples, the tuning determiner circuitry 204 may be instantiated by hardware logic circuitry, which may be implemented by an ASIC, XPU, or the FPGA circuitry 800 of FIG. 8 structured to perform operations corresponding to the machine readable instructions. Additionally or alternatively, the tuning determiner circuitry 204 may be instantiated by any other combination of hardware, software, and/or firmware. For example, the tuning determiner circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining probability. For example, the means for determining probability may be implemented by probability determiner circuitry 206. In some examples, the probability determiner circuitry 206 may be instantiated by processor circuitry such as the example processor circuitry 612 of FIG. 6. For instance, the probability determiner circuitry 206 may be instantiated by the example microprocessor 700 of FIG. 7 executing machine executable instructions such as those implemented by at least blocks 415, 420, 425 of FIG. 4. In some examples, the probability determiner circuitry 206 may be instantiated by hardware logic circuitry, which may be implemented by an ASIC, XPU, or the FPGA circuitry 800 of FIG. 8 structured to perform operations corresponding to the machine readable instructions. Additionally or alternatively, the tuning determiner circuitry 204 may be instantiated by any other combination of hardware, software, and/or firmware. For example, the probability determiner circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining additive reach. For example, the means for determining additive reach may be implemented by additive reach determiner circuitry 208. In some examples, the additive reach determiner circuitry 208 may be instantiated by processor circuitry such as the example processor circuitry 612 of FIG. 6. For instance, the additive reach determiner circuitry 208 may be instantiated by the example microprocessor 700 of FIG. 7 executing machine executable instructions such as those implemented by at least blocks 430 of FIG. 4. In some examples, the additive reach determiner circuitry 208 may be instantiated by hardware logic circuitry, which may be implemented by an ASIC, XPU, or the FPGA circuitry 800 of FIG. 8 structured to perform operations corresponding to the machine readable instructions. Additionally or alternatively, the additive reach determiner circuitry 208 may be instantiated by any other combination of hardware, software, and/or firmware. For example, the additive reach determiner circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating crediting output. For example, the means for generating crediting output may be implemented by crediting output generator circuitry 210. In some examples, the crediting output generator circuitry 210 may be instantiated by processor circuitry such as the example processor circuitry 612 of FIG. 6. For instance, the crediting output generator circuitry 210 may be instantiated by the example microprocessor 700 of FIG. 7 executing machine executable instructions such as those implemented by at least block 320 of FIG. 3. In some examples, the crediting output generator circuitry 210 may be instantiated by hardware logic circuitry, which may be implemented by an ASIC, XPU, or the FPGA circuitry 800 of FIG. 8 structured to perform operations corresponding to the machine readable instructions. Additionally or alternatively, the crediting output generator circuitry 210 may be instantiated by any other combination of hardware, software, and/or firmware. For example, the crediting output generator circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the additive reach adjustment circuitry 120 of FIG. 1 is illustrated in FIG.

2, one or more of the elements, processes, and/or devices illustrated in FIG. 2 may be combined, divided, re-arranged, omitted, eliminated, and/or implemented in any other way. Further, the example data receiver circuitry 202, the example tuning determiner circuitry 204, the example probability determiner circuitry 206, the example additive reach determiner circuitry 208, the example crediting output generator circuitry 210 and/or, more generally, the example additive reach adjustment circuitry 120 of FIG. 1, may be implemented by hardware, software, firmware, and/or any combination of hardware, software, and/or firmware. Thus, for example, any of the data receiver circuitry 202, the tuning determiner circuitry 204, the probability determiner circuitry 206, the additive reach determiner circuitry 208, the crediting output generator circuitry 210 and/or, more generally, the example additive reach adjustment circuitry 120 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example additive reach adjustment circuitry 120 may include one or more elements, processes, and/or devices in addition to, or instead of, those illustrated in FIG. 2, and/or may include more than one of any or all of the illustrated elements, processes and devices.

Figure 3:
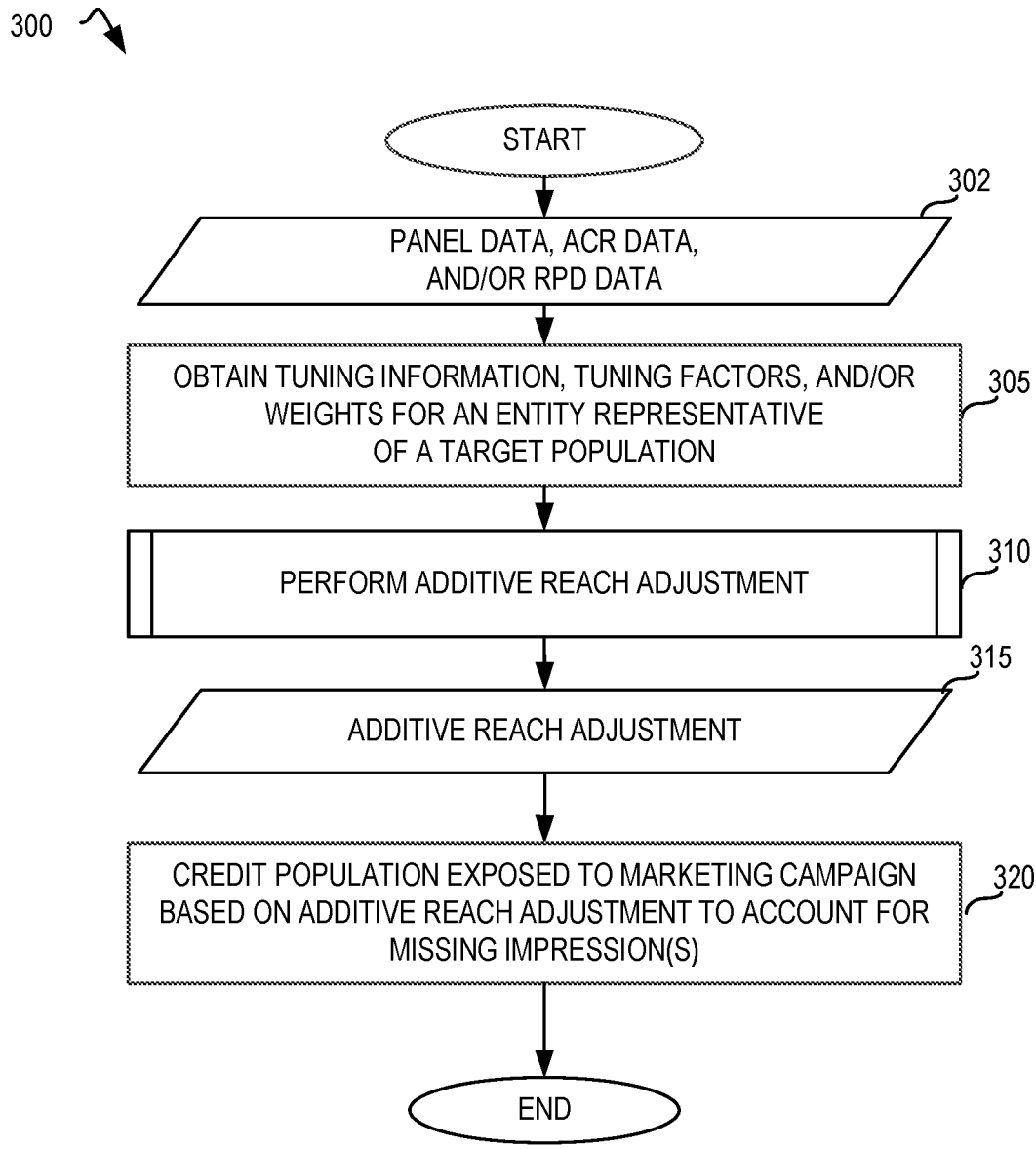
FIG. 3 is a flowchart representative of example machine readable instructions and/or example operations that may be executed by example processor circuitry to implement the additive reach adjustment circuitry of FIG. 1.
Figure 4:
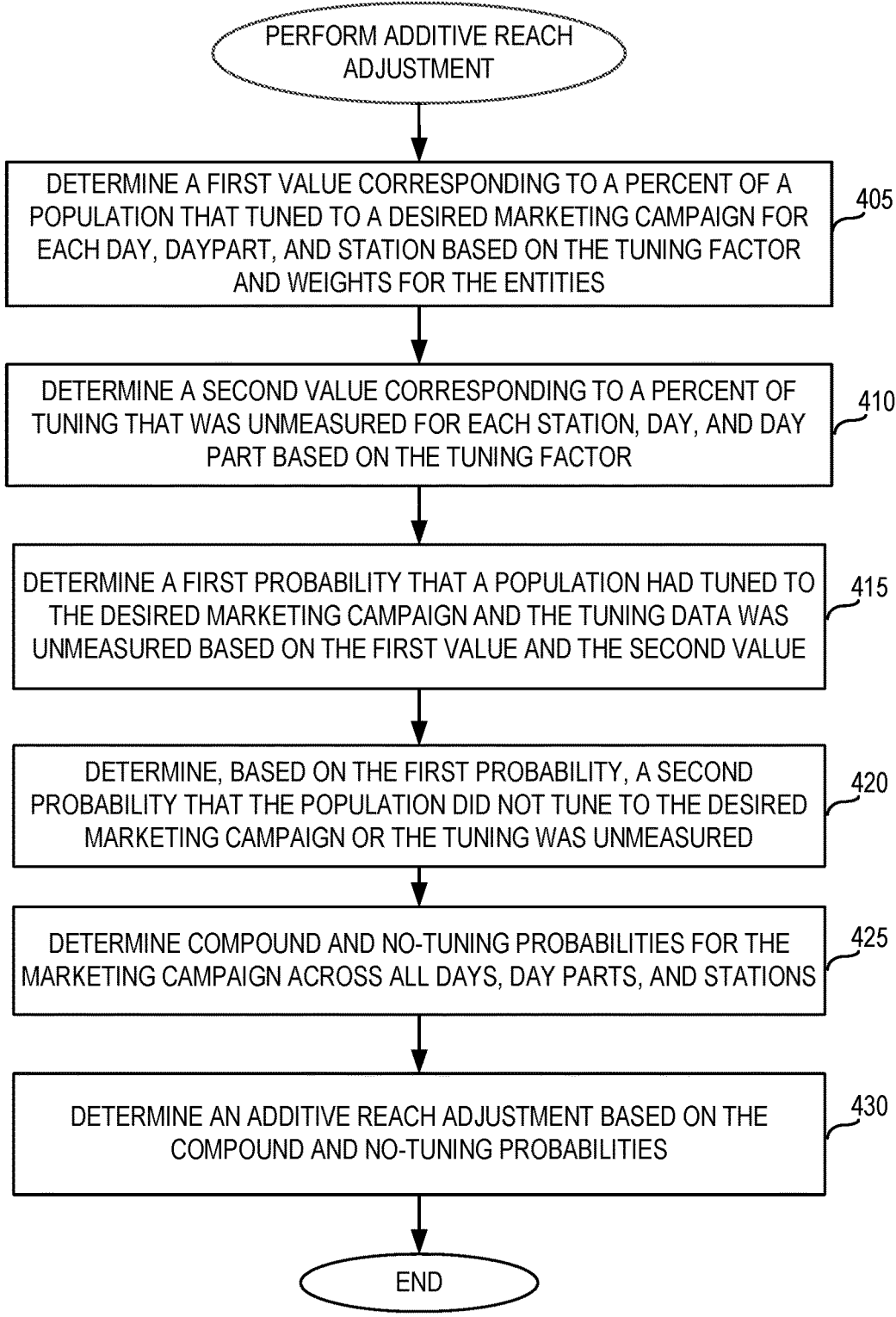
FIG. 4 is a flowchart representative of example machine readable instructions and/or example operations that may be executed by example processor circuitry to perform additive reach adjustment.

Flowcharts representative of example hardware logic circuitry, machine readable instructions, hardware implemented state machines, and/or any combination thereof for implementing the additive reach adjustment circuitry 120 are shown in FIGS. 3-4. The machine readable instructions may be one or more executable programs or portion(s) of an executable program for execution by processor circuitry, such as the processor circuitry 612 shown in the example processor platform 600 discussed below in connection with FIG. 6, and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) are described with reference to the flowcharts illustrated in FIGS. 3 and/or 4, many other methods of implementing the example additive reach adjustment circuitry 120 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4 and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second", etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or operations 300 that may be executed and/or instantiated by processor circuitry to implement the example additive reach adjustment circuitry 120 of FIG. 1. The machine readable instructions and/or the operations 300 of FIG. 3 begin at block 302, at which the data receiver circuitry 202 receives viewership data associated with return path data (RPD) 115, automatic content recognition (ACR) software-based data 116, and/or panel data 117 of FIG. 1. In the example of FIG. 3, the data receiver circuitry 202 obtains station-based tuning information, tuning factors, and/or weights for entities representative of a target population (block 305). For example, some stations can include missing tuning due to unrecognized ACR content and/or some additional weight may be given to stations during certain time period(s) to account for missing tuning (e.g., using multiplicative station tuning factors, etc.). In examples disclosed herein, the reach can be calculated normally (e.g., without factoring in the measured station factors). For example, a probability that all of a person's tuning went unmeasured can be calculated and added to the final reach calculation (e.g., based on an additive reach adjustment). As such, in the example of FIG. 3, the additive reach adjustment circuitry 120 performs additive reach adjustment based on the tuning information obtained using the data receiver circuitry 202 (block 310), as described in more detail in connection with FIG. 4. The additive reach adjustment circuitry 120 outputs the additive reach adjustment (block 315). The crediting output generator circuitry 210 credits population exposed to a marketing campaign based on the additive reach adjustment to account for missing impression(s) (block 320). For example, an unmeasured reach percentage can be added as an adjustment to a calculated reach from a given data set (e.g., used to determine whether or not someone viewed a campaign during a given time period while ignoring any station adjustment factors). As such, reach is calculated on tuning data without the use of station factors, and the resulting calculated reach adjustment can be added to the calculated reach of a marketing campaign to obtain a final reach of a marketing campaign (e.g., adjusted to account for missing tuning).

FIG. 4 is a flowchart representative of example machine readable instructions and/or example operations 310 that may be executed by example processor circuitry to cause the processor to perform additive reach adjustment. The machine readable instructions and/or the operations 310 of FIG. 3 begin at block 405, at which the tuning determiner circuitry 204 determines a first value corresponding to a percent of a population that tuned to a desired marketing campaign for each day, daypart, and station based on the tuning factors and the weights for the entities (block 405). For example, the tuning determiner circuitry 204 determines the probability that a given population was exposed to station(s) of interest, as shown in connection with FIG. 5B. For example, as described in connection with FIG. 5B, the tuning determiner circuitry 204 calculates total impressions per day and/or daypart by summing together station factors when a station is credited and dividing by a universe estimate to obtain a percent of the universe estimate that viewed and/or was exposed to a given station of interest, obtaining a probability of viewing for that station of interest. In the example of FIG. 4, the tuning determiner circuitry 204 determines a second value corresponding to a percent of tuning that was unmeasured for each station, day, and daypart based on the tuning factors (block 410). For example, as described in connection with FIG. 5B, the tuning determiner circuitry 204 derives a percentage of the universe estimate that did not watch a given station of interest (e.g., 1—probability of viewing), based on the universe estimate determined to have viewed the station.

The probability determiner circuitry 206 determines a first probability that a population had tuned to the desired marketing campaign and the tuning data was unmeasured (block 415). For example, the probability determiner circuitry 206 determines the first probability based on the first value and the second value determined using the tuning determiner circuitry 204. As shown in more detail in connection with FIG. 5C, the probability determiner circuitry 206 determines the first probability that a population had tuned to the desired marketing campaign and the tuning data was unmeasured by multiplying a percent associated with population tuning (e.g., 5%) with a percent associated with missing and/or unmeasured tuning (e.g., 10%), to obtain the percentage of the population that was exposed to a given station of interest but also had missing and/or unmeasured tuning data (e.g., 0.50%). In the example of FIG. 4, the probability determiner circuitry 206 determines based on the first probability, a second probability that the population did not tune to the desired marketing campaign or the tuning was unmeasured (block 420). For example, as described in connection with FIG. 5D, the probability determiner circuitry 206 determines the second probability by summing a percentage of the population without tuning (e.g., 95%) and the percentage of the population that was exposed to a given station but has missing tuning data (e.g., 0.50%), obtaining a percentage of the population that did not include tuning or included tuning with missing tuning data (e.g., 95.50%).

In the example of FIG. 4, the probability determiner circuitry 206 determines (i) a compound probability that the population was not exposed to (e.g., did not tune to) the marketing campaign or the tuning was unmeasured across all days, dayparts, and stations, and (ii) a no-tuning probability corresponding to the probability that the population was not exposed to (e.g., did not tune to) the marketing campaign across all days, day parts, and stations (block 425). For example, the probability determiner circuitry 206 determines the compound and no-tuning probabilities as shown in more detail in connection with FIG. 5E. Based on the compound and no-tuning probabilities determined using the probability determiner circuitry 206, the additive reach determiner circuitry 208 determines an additive reach adjustment to obtain a final marketing campaign reach calculation (block 430). For example, the additive reach adjustment represents a probability (or percentage) that an entity was exposed to the marketing campaign but was not credited for the impressions. For example, the additive reach determiner circuitry 208 determines the additive reach adjustment factor as shown in more detail in connection with FIG. 5F.

FIG. 5A illustrates example data including a comparison between true tuning data 502 and big data including unmeasured tuning 509, 510. For example, FIG. 5A includes two example unmeasured station impact scenarios. In FIG. 5A, true tuning data 502 includes a daypart 504 associated with the tuning, example tuning for station A 506, and example tuning for station B. True tuning data 502 corresponds to what a given individual (e.g., viewer) has actually watched. For example, on a particular day, the viewer may watch station A 506 but not station B 508. However, due to missing tuning data, the big data including unmeasured tuning 509, 510 incorrectly shows that the viewer has watched neither station A 506 nor station B 508, as shown on day (part) four (e.g., station A=1, station B=0 for true tuning 502 and station A=0, station B=0 for big data tuning 509). In the example of big data including unmeasured tuning 509, part of the tuning is missing, while in the example of big data 510, all of the tuning data is missing (e.g., unmeasured), and the viewer is therefore not counted in the total market campaign reach. As such, methods and apparatus disclosed herein determine how often this non-measurement occurs and uses the determined probability of non-measurement as part of the additive reach adjustment. For example, missing tuning can create instances where reach is lower than it should be due to the presence of viewers missing tuning. In some examples, only where all of a viewer's tuning associated with the market campaign is missing results in the unmeasured stations affecting the total market campaign reach. In other examples, only some of the viewer's tuning to a campaign is missing, such that the viewer is still included in the reach determination. In examples disclosed herein, the additive reach adjustment circuitry 120 determines a percentage of individuals where all tuning to the campaign during a given time period is missing and uses this percentage as an additive adjustment factor when calculating the total reach.

FIG. 5B illustrates example data including a probability that a population was exposed to given station(s) during a marketing campaign 512 and a percentage of tuning that remains unmeasured 520. In the example of FIG. 5B, the tuning determiner circuitry 204 determines (i) the percent of a population that tuned to a desired marketing campaign for a given day, daypart, and station based on a tuning factor and weight for the entity (e.g., by multiplying each person's weight by the station factor if that person tuned to the station during the daypart and then summing over the persons) and (ii) the percent of tuning that went missing (e.g., was unmeasured) for each station, day, and day part (e.g., by subtracting the inverse of the tuning factor from 1). In the example of FIG. 5B, the tuning determiner circuitry 204 determines impressions 514 and the probability of viewership 516 (e.g., based on a ratio of impressions to the universe estimate). For example, given tuning data and station factors, the tuning determiner circuitry 204 determines the total number of impressions per day, per day part, and/or per station. For example, the tuning determiner circuitry 204 calculates the total impressions 514 per day and day part by summing together station factors when a station is credited. The tuning determiner circuitry 204 divides the impressions 514 by the universe estimate to obtain a percentage of the universe estimate that were part of the viewership (e.g., probability of viewership 516). In the example of FIG. 5B, the tuning determiner circuitry 204 calculates the percentage of tuning that goes unmeasured, assuming only one station factor per station per daypart. For example, the percentage of station tuning that is unmeasured 520 for station A 521 and station B 522 is determined using a station factor (e.g., 1.2, 1.5, etc.) and a formula corresponding the unmeasured tuning percent (e.g., 1−(1/station factor)), resulting in an unmeasured tuning percent of 16.67% for station A 521 and 33.33% for station B 522.

FIG. 5C illustrates example data including probability of exposure and unmeasured tuning 530 obtained based on a percentage of a population tuning and a percentage of tuning that is missing and/or unmeasured 525. In the example of FIG. 5C, the probability determiner circuitry 206 determines a first probability 532 for stations A, B that a population tuned to a desired marketing campaign and the tuning data was unmeasured (e.g., by multiplying the percent of population tuning 526 by the corresponding percent of tuning missing 528).

FIG. 5D illustrates example data including probabilities associated with a given population of viewers tuning and/or not tuning 545 and associated percentages of a population tuning but including missing data 550. For example, the probability determiner circuitry 206 determines, based on the first probability 532 determined in connection with FIG. 5C, a second probability 555 that the population did not tune to the desired marketing campaign or the tuning was unmeasured (e.g., by subtracting the percentage of population tuning 526 from the value 1 to yield the percentage of the population not tuning 548, and adding the entries of the percentage of the population not tuning 548 to the corresponding entries of the table associated with the percentage of population tuning 526 to yield the percentages of a population tuning but including missing data 550).

FIG. 5E illustrates example compound probabilities for a population not tuning or tuning with unmeasured and/or missing tuning data 560 and no-tuning probabilities for not tuning for all days and all stations 570. For example, the probability determiner circuitry 206 determines (1) a compound probability 565 that the population was not exposed to (e.g., did not tune to) a marketing campaign or the tuning was unmeasured across all days, day parts, and stations (e.g., by multiplying the second probability 555 for a given day and daypart for each station A, B to yield the product 563 of A and B and then summing the result to yield the compound probability 565), and (2) a separate no-tuning probability 572 corresponding to the probability that the population was not exposed to (e.g., did not tune to) the marketing campaign across all days, day parts, and stations (e.g., by multiplying the percentage of the population not tuning 548 of FIG. 5D for a given day and daypart to yield the product 575 of A and B, and then summing the result to yield the no-tuning probability 572). FIG. 5F illustrates example additive unmeasured reach adjustment 580 based on (1) the compound probability 565 and (2) the no-tuning probability 572 determined in connection with FIG. 5E. In the example of FIG. 5F, the additive reach determiner circuitry 208 determines an additive reach adjustment factor (e.g., 4.23%) based on a difference between the compound probability 565 (e.g., 49.77%) and no-tuning probability 572 (e.g., 45.53%).

Figure 6:
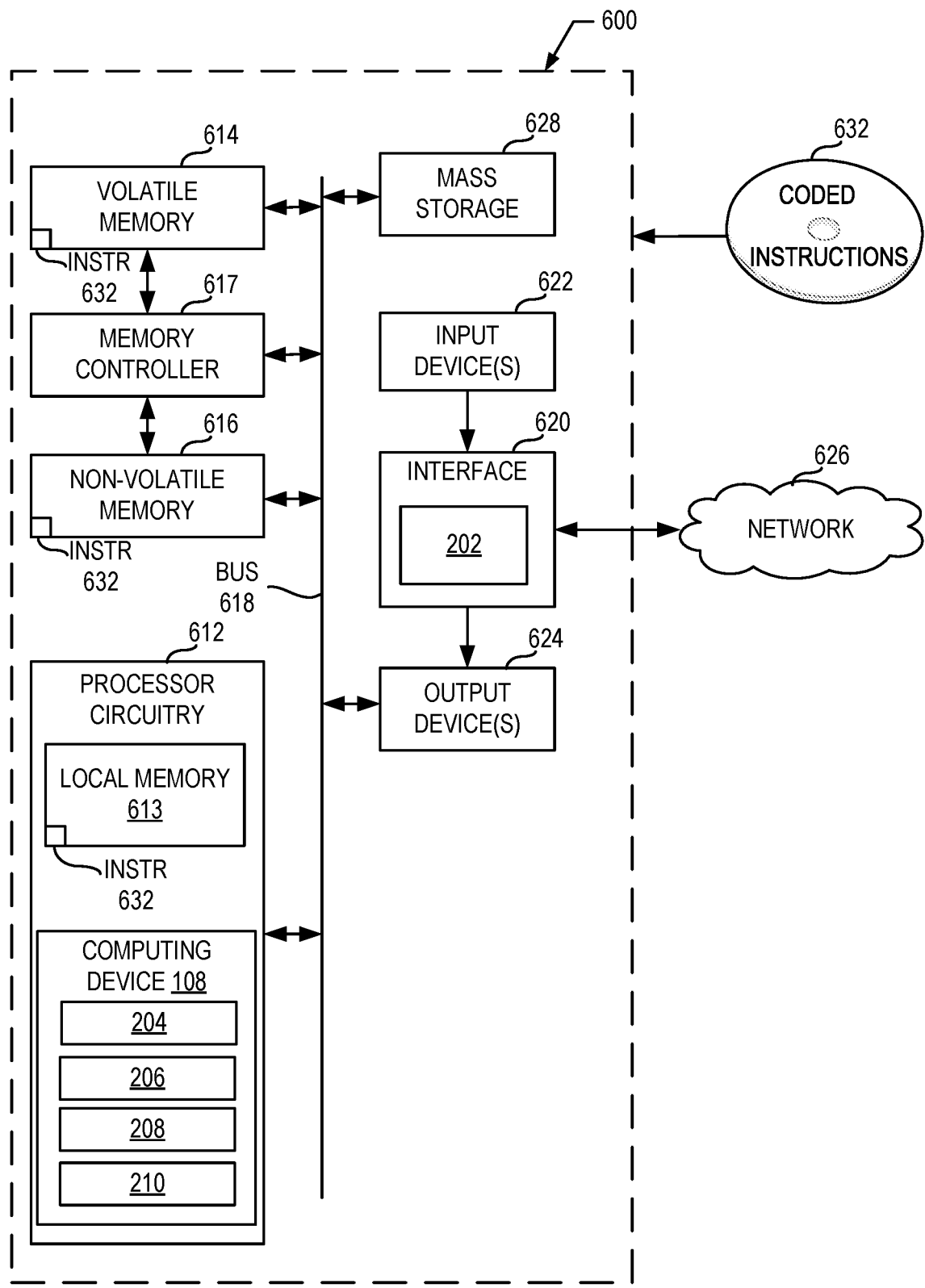
FIG. 6 is a block diagram of an example processing platform including processor circuitry structured to execute the example machine readable instructions and/or the example operations of FIG. 3 to implement the example additive reach adjustment circuitry of FIG. 1.

FIG. 6 is a block diagram of an example processor platform 600 structured to execute and/or instantiate the machine readable instructions and/or operations of FIGS. 3 and/or 4 to implement the additive reach adjustment circuitry 120 of FIGS. 1 and 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example data receiver circuitry 202, the example tuning determiner circuitry 204, the example probability determiner circuitry 206, the example additive reach determiner circuitry 208, and/or the example crediting output generator circuitry 210. The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIGS. 3-4, may be stored in the mass storage device 628, in the volatile memory 614, in the non-volatile memory 616, and/or on a removable non-transitory computer readable storage medium such as a CD or DVD.

Figure 7:
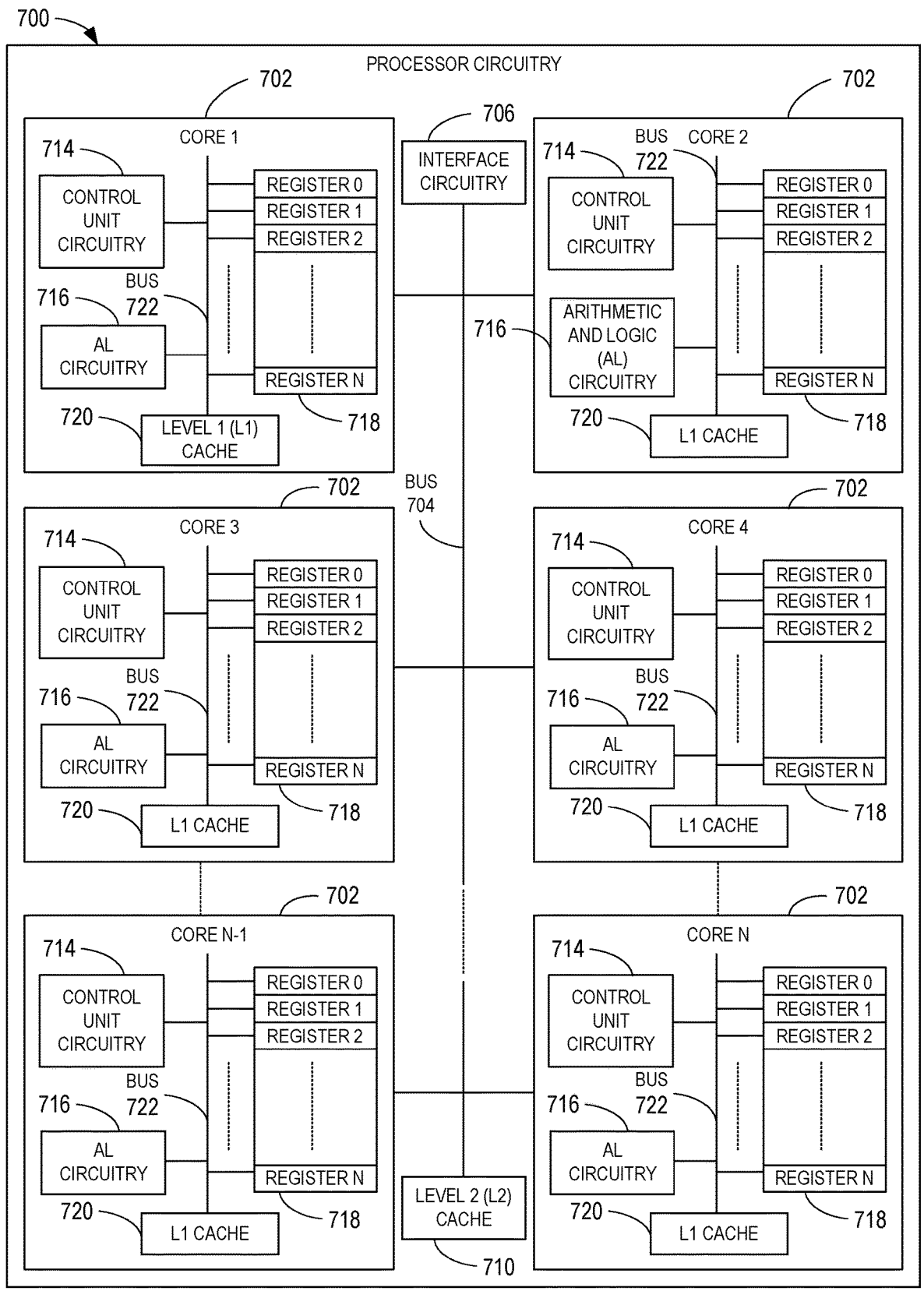
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may be a general purpose microprocessor (e.g., general purpose microprocessor circuitry). The microprocessor 700 executes some or all of the machine readable instructions of the flowcharts of FIGS. 3 and/or 4 to effectively instantiate the circuitry of FIGS. 1 and/or 2 as logic circuits to perform the operations corresponding to those machine readable instructions. In some such examples, the circuitry of FIGS. 1 and/or 2 is instantiated by the hardware circuits of the microprocessor 700 in combination with the instructions. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 3 and/or 4.

The cores 1702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer-based operations. In other examples, the AL circuitry 716 also performs floating point operations. In yet other examples, the AL circuitry 716 may include first AL circuitry that performs integer-based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
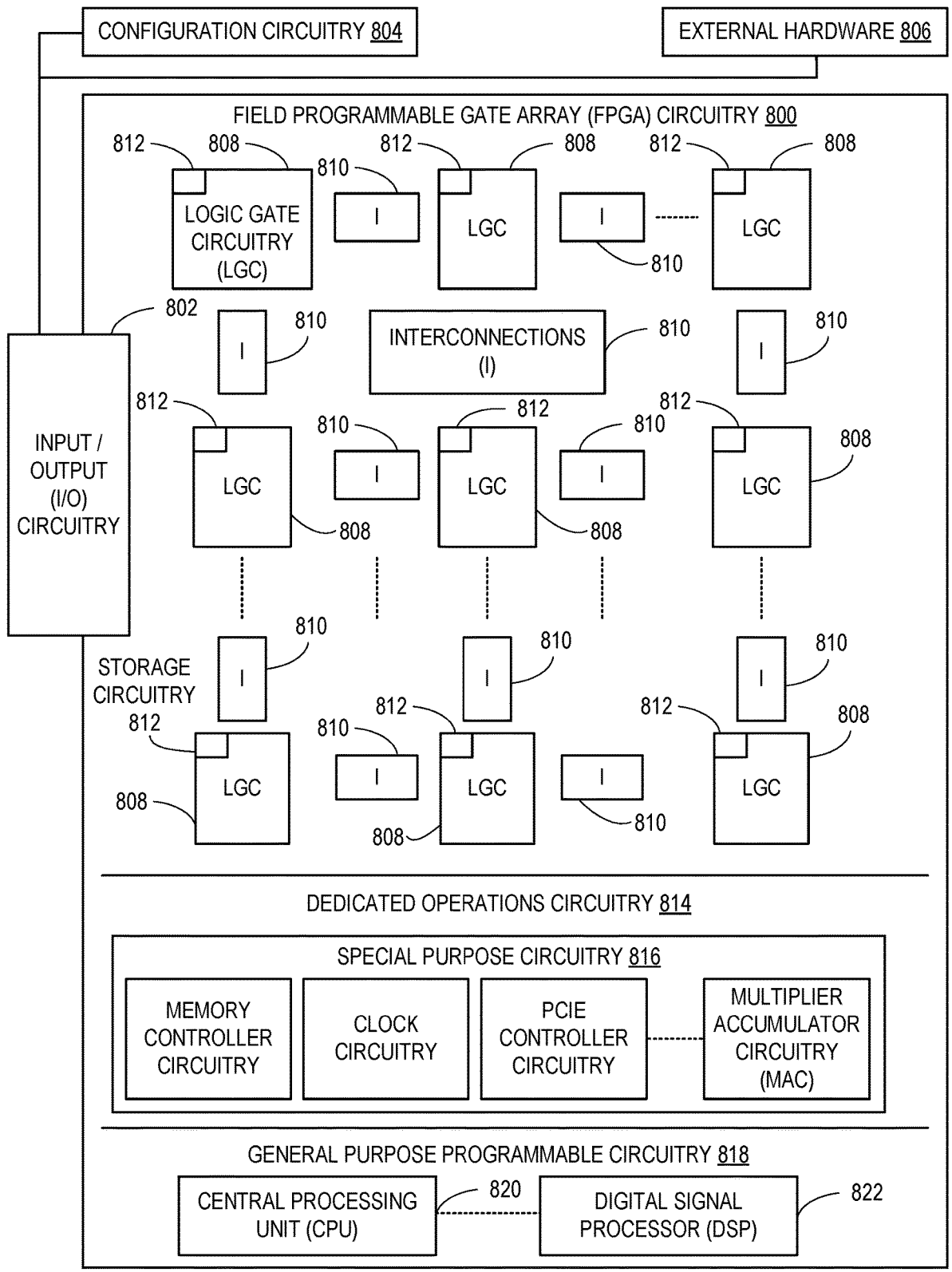
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 3 and/or 4 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3 and/or 4. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3 and/or 4. As such, the FPGA circuitry 800 may be structured to effectively instantiate some or all of the machine readable instructions of the flowcharts of FIGS. 3 and/or 4 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3 and/or 4 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may be implemented by external hardware circuitry. For example, the external hardware 806 may be implemented by the microprocessor 800 of FIG. 8. The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations that may correspond to at least some of the machine readable instructions of FIGS. 3 and/or 4 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3 and/or 4 may be executed by one or more of the cores 702 of FIG. 7, a second portion of the machine readable instructions represented by the flowcharts of FIGS. 3 and/or 4 may be executed by the FPGA circuitry 800 of FIG. 8, and/or a third portion of the machine readable instructions represented by the flowcharts of FIGS. 3 and/or 4 may be executed by an ASIC. It should be understood that some or all of the circuitry of FIG. 6 may, thus, be instantiated at the same or different times. Some or all of the circuitry may be instantiated, for example, in one or more threads executing concurrently and/or in series. Moreover, in some examples, some or all of the circuitry of FIG. 6 may be implemented within one or more virtual machines and/or containers executing on the microprocessor.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6 which may be in one or more packages. For example, the XPU may include a CPU in one package, a DSP in another package, a GPU in yet another package, and an FPGA in still yet another package.

Figure 9:
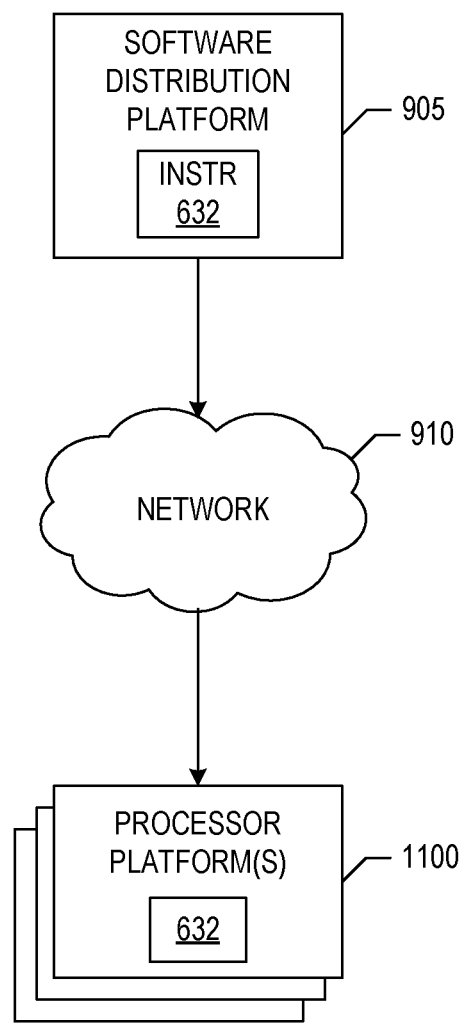
FIG. 9 is a block diagram of an example software distribution platform (e.g., one or more servers) to distribute software (e.g., software corresponding to the example machine readable instructions of FIG. 3) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632 of FIG. 6, which may correspond to the example machine readable instructions 300, 310 of FIGS. 3 and/or 4, as described above. The one or more servers of the example software distribution platform 905 are in communication with a network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 300 and/or 310 of FIGS. 3 and/or 4 may be downloaded to the example processor platform 600 which is to execute the machine readable instructions 632 to implement the additive reach adjustment circuitry 120. In some example, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that determine an additive reach adjustment factor to facilitate accurately estimating reach on-demand (e.g., in real-time). Disclosed systems, methods, apparatus, and articles of manufacture improve the efficiency of using a computing device by reducing computation cycles that would be required for re-calculating reach when station factors do not accurately represent a true reach. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine additive reach adjustment factors for audience measurement are disclosed herein. Further examples and combinations thereof include the following:

Example 1 includes an apparatus for additive reach adjustment, the apparatus comprising at least one memory, machine readable instructions, and processor circuitry to execute the machine readable instructions to identify a first probability, the first probability associated with a population tuning to a marketing campaign, the tuning including missing data, identify a second probability, the second probability associated with the population not tuning to the marketing campaign or the tuning including missing data, determine an additive reach adjustment based on a compound probability and a no-tuning probability, the compound probability and the no-tuning probability determined using the first probability and the second probability, and credit a population exposed to the marketing campaign to include missing impressions based on the additive reach adjustment.

Example 2 includes the apparatus of example 1, wherein the processor circuitry is to obtain a station tuning factor to determine a first value corresponding to a percentage of the population that tuned to a desired marketing campaign for each day, daypart, and station.

Example 3 includes the apparatus of example 2, wherein the processor circuitry is to determine a second value corresponding to a percentage of tuning that was unmeasured for each station, day, and daypart based on the station tuning factor.

Example 4 includes the apparatus of example 2, wherein the processor circuitry is to determine an entity weight value indicative of a number of people in the population represented by an entity, the entity corresponding to a group of individuals to be affected by the marketing campaign.

Example 5 includes the apparatus of example 4, wherein the processor circuitry is to determine the first value based on the station tuning factor and the entity weight value.

Example 6 includes the apparatus of example 2, wherein the processor circuitry is to determine the first probability based on the first value and the second value.

Example 7 includes the apparatus of example 1, wherein the processor circuitry is to identify missing data based on automatic content recognition (ACR) data collection.

Example 8 includes the apparatus of example 7, wherein tuning data is missing due to unidentified ACR content.

Example 9 includes a method for viewership adjustment, the method comprising identifying a first probability, the first probability associated with a population tuning to a marketing campaign, the tuning including missing data, identifying a second probability, the second probability associated with the population not tuning to the marketing campaign or the tuning including tuning data, determining an additive reach adjustment based on a compound probability and a no-tuning probability, the compound probability and the no-tuning probability determined using the first probability and the second probability, and crediting a population exposed to the marketing campaign to include missing impressions based on the additive reach adjustment.

Example 10 includes the method of example 9, further including obtaining a station tuning factor to determine a first value corresponding to a percentage of the population that tuned to a desired marketing campaign for each day, daypart, and station.

Example 11 includes the method of example 10, further including determining a second value corresponding to a percentage of tuning that was unmeasured for each station, day, and daypart based on the station tuning factor.

Example 12 includes the method of example 10, further including determining an entity weight value indicative of a number of people in the population represented by an entity, the entity corresponding to a group of individuals to be affected by the marketing campaign.

Example 13 includes the method of example 12, further including determining the first value based on the station tuning factor and the entity weight value.

Example 14 includes the method of example 9, further including determining the first probability based on the first value and the second value.

Example 15 includes the method of example 9, further including identifying missing data using based on automatic content recognition (ACR) data collection.

Example 16 includes a non-transitory computer readable storage medium comprising instructions that, when executed, cause a processor to at least identify a first probability, the first probability associated with a population tuning to a marketing campaign, the tuning including missing data, identify a second probability, the second probability associated with the population not tuning to the marketing campaign or the tuning including missing data, determine an additive reach adjustment based on a compound probability and a no-tuning probability, the compound probability and the no-tuning probability determined using the first probability and the second probability, and credit a population exposed to the marketing campaign to include missing impressions based on the additive reach adjustment.

Example 17 includes the non-transitory computer readable storage medium of example 16, wherein the instructions, when executed, cause the processor to obtain a station tuning factor to determine a first value corresponding to a percentage of the population that tuned to a desired marketing campaign for each day, daypart, and station.

Example 18 includes the non-transitory computer readable storage medium of example 17, wherein the instructions, when executed, cause the processor to obtain a station tuning factor to determine a second value corresponding to a percentage of tuning that was unmeasured for each station, day, and daypart based on the station tuning factor.

Example 19 includes the non-transitory computer readable storage medium of example 17, wherein the instructions, when executed, cause the processor to determine an entity weight value indicative of a number of people in the population represented by an entity, the entity corresponding to a group of individuals to be affected by the marketing campaign.

Example 20 includes the non-transitory computer readable storage medium of example 17, wherein the instructions, when executed, cause the processor to identify missing data based on automatic content recognition (ACR) data collection.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for additive reach adjustment, the apparatus comprising:
   a processor; and
   a non-transitory computer-readable storage medium, having stored thereon program instructions that, upon execution by the processor, cause performance of a set of operations comprising:
   identifying unmeasured tuning data from among tuning data based on automatic content recognition (ACR) data collection associated with the unmeasured tuning data;
   identifying a first probability, the first probability associated with a population that was tuned to a marketing campaign, the population associated with the tuning data including the unmeasured tuning data;
   identifying a second probability, the second probability associated with a population that was not tuned to the marketing campaign or that the tuning data included unmeasured tuning data;
   determining an additive reach adjustment based on a compound probability and a no-tuning probability, the compound probability and the no-tuning probability determined using the first probability and the second probability; and
   crediting a population exposed to the marketing campaign to include missing impressions based on the additive reach adjustment.

2. The apparatus of claim 1, wherein the operations further comprise obtaining a station tuning factor to determine a first value corresponding to a percentage of the population that was tuned to the marketing campaign for each day, daypart, and station.

3. The apparatus of claim 2, wherein the operations further comprise determining a second value corresponding to a percentage of tuning that was the unmeasured tuning data for each station, day, and daypart based on the station tuning factor.

4. The apparatus of claim 2, wherein the operations further comprise determining an entity weight value indicative of a number of people in the population represented by an entity, the entity corresponding to a group of individuals to be affected by the marketing campaign.

5. The apparatus of claim 4, wherein the operations further comprise determining the first value based on the station tuning factor and the entity weight value.

6. The apparatus of claim 3, wherein the operations further comprise determining the first probability based on the first value and the second value.

7. The apparatus of claim 1, wherein the unmeasured tuning data is classified as missing based on unidentified ACR content from the ACR data collection.

8. A method for viewership adjustment, the method comprising:
   identifying unmeasured tuning data from among tuning data based on automatic content recognition (ACR) data collection associated with the unmeasured tuning data;
   identifying a first probability, the first probability associated with a population that was tuned to a marketing campaign, the population associated with the tuning data including the unmeasured tuning data;

identifying a second probability, the second probability associated with a population that was not tuned to the marketing campaign or that the tuning data included unmeasured tuning data;

determining an additive reach adjustment based on a compound probability and a no-tuning probability, the compound probability and the no-tuning probability determined using the first probability and the second probability; and crediting a population exposed to the marketing campaign to include missing impressions based on the additive reach adjustment.

9. The method of claim 8, further including obtaining a station tuning factor to determine a first value corresponding to a percentage of the population that was tuned to the marketing campaign for each day, daypart, and station.

10. The method of claim 9, further including determining a second value corresponding to a percentage of tuning that was the unmeasured tuning data for each station, day, and daypart based on the station tuning factor.

11. The method of claim 9, further including determining an entity weight value indicative of a number of people in the population represented by an entity, the entity corresponding to a group of individuals to be affected by the marketing campaign.

12. The method of claim 11, further including determining the first value based on the station tuning factor and the entity weight value.

13. The method of claim 10, further including determining the first probability based on the first value and the second value.

14. A non-transitory computer readable storage medium comprising instructions that, when executed, cause a processor to at least:

identify unmeasured tuning data from among tuning data based on automatic content recognition (ACR) data collection associated with the unmeasured tuning data;

identify a first probability, the first probability associated with a population that was tuned to a marketing campaign, the population associated with the tuning data including the unmeasured tuning data;

identify a second probability, the second probability associated with a population that was not tuned to the marketing campaign or that the tuning data included unmeasured tuning data;

determine an additive reach adjustment based on a compound probability and a no-tuning probability, the compound probability and the no-tuning probability determined using the first probability and the second probability; and credit a population exposed to the marketing campaign to include missing impressions based on the additive reach adjustment.

15. The non-transitory computer readable storage medium of claim 14, wherein the instructions, when executed, cause the processor to obtain a station tuning factor to determine a first value corresponding to a percentage of the population that was tuned to the marketing campaign for each day, daypart, and station.

16. The non-transitory computer readable storage medium of claim 15, wherein the instructions, when executed, cause the processor to obtain a station tuning factor to determine a second value corresponding to a percentage of tuning that was the unmeasured tuning data for each station, day, and daypart based on the station tuning factor.

17. The non-transitory computer readable storage medium of claim 15, wherein the instructions, when executed, cause the processor to determine an entity weight value indicative of a number of people in the population represented by an entity, the entity corresponding to a group of individuals to be affected by the marketing campaign.

18. The method of claim 8, wherein the unmeasured tuning data is classified as missing based on unidentified ACR content from the ACR data collection.

19. The non-transitory computer readable storage medium of claim 14, wherein the unmeasured tuning data is classified as missing based on unidentified ACR content from the ACR data collection.

* * * * *